(12) United States Patent
Kato et al.

(10) Patent No.: US 9,040,631 B1
(45) Date of Patent: May 26, 2015

(54) PADDING

(75) Inventors: Atsushi Kato, Osaka (JP); Naoki Kawanaka, Okayama (JP); Masao Ieno, Okayama (JP)

(73) Assignees: TOYOBO CO., LTD., Osaka-shi (JP); JAPAN EXLAN COMPANY LIMITED, Osaka-shi (JP)

( * ) Notice: Subject to any disclaimer, the term of this patent is extended or adjusted under 35 U.S.C. 154(b) by 15 days.

(21) Appl. No.: 14/117,242

(22) PCT Filed: Jun. 29, 2012

(86) PCT No.: PCT/JP2012/066692
§ 371 (c)(1),
(2), (4) Date: Nov. 12, 2013

(87) PCT Pub. No.: WO2013/002367
PCT Pub. Date: Jan. 3, 2013

(30) Foreign Application Priority Data

Jun. 30, 2011 (JP) .................................. 2011-145742

(51) Int. Cl.
*C08F 8/00* (2006.01)
*A47G 9/02* (2006.01)
*C08L 33/08* (2006.01)
*C08L 67/00* (2006.01)
*C08L 67/02* (2006.01)

(52) U.S. Cl.
CPC . *A47G 9/02* (2013.01); *C08L 33/08* (2013.01); *C08L 67/00* (2013.01)

(58) Field of Classification Search
USPC .......................................................... 525/176
See application file for complete search history.

(56) References Cited

FOREIGN PATENT DOCUMENTS

| JP | 07-59762 B2 | 6/1995 |
| JP | 09-059872 A | 3/1997 |
| JP | 10-313995 A | 12/1998 |
| JP | 4529145 B2 | 8/2010 |
| WO | 2006/027910 A1 | 3/2006 |

OTHER PUBLICATIONS

Notification of Transmittal of Translation of the International Preliminary Report on Patentability (Form PCT/IPEA/409) of International Application No. PCT/JP2012/066692 mailed on Jan. 3, 2014 with Form PCT/B/338, w/English Translation. (6 pages).
Extended European Search Report dated Nov. 17, 2014, issued in corresponding European Application No. 12804726.3. (3 pages).
International Search Report dated Jul. 31, 2012, issued in correspnding application No. PCT/JP2012/066692.

*Primary Examiner* — Terressa Boykin
(74) *Attorney, Agent, or Firm* — Westerman, Hattori, Daniels & Adrian, LLP

(57) ABSTRACT

The present invention provides padding which is suitable as bedding and clothing items having both exothermic property upon moisture absorption and bulkiness in high levels and being able to give comfortable environment to human body. The present invention relates to a padding containing 25 to 85% by weight of polyester fiber, characterized in that the padding contains 15 to 75% by weight of a cross-linked polyacrylate fiber of a magnesium salt type and/or a calcium salt type.

6 Claims, 1 Drawing Sheet

PADDING

TECHNICAL FIELD OF THE INVENTION

The present invention relates to padding having both exothermic property upon moisture absorption which results in warm air with low humidity and also bulkiness which results in warmth-keeping property in high levels and being able to be comfortably used as bedding, clothing, etc.

BACKGROUND ART

Padding is usually used by sealing into bedclothes, cushions, clothing, etc. which directly contact the human skin. In the case of bedclothes for example, it is important to attain comfortable in-bed climate in terms of temperature and humidity and, for such a purpose, it is preferred that long-lasting warmth-keeping property and exothermic property upon moisture absorption can be achieved. As to the padding up to now, there have been proposed many types which use multipurpose fiber such as polyester and which use moisture absorptive/desorptive cross-linked acrylic fiber (See Patent Document 1).

The padding which uses a multipurpose fiber such as polyester exhibits sufficiently high bulkiness and can contain much air therein whereby a high warmth-keeping property can be maintained. However, there is a problem therein that it is not possible to adsorb the moisture in the air incorporated thereinto so as to convert the incorporated air into comfortable air. In addition, in the padding where the moisture absorptive/desorptive crosslinked acrylic fiber of the conventional sodium salt type is used, although it adsorbs the moisture of the air contained in the padding and generates the heat whereby it can convert the contained air into the air which is comfortable to human body, there is a problem therein in terms of sustaining the effect of warmth-keeping property due to its low bulkiness.

PRIOR ART DOCUMENTS

Patent Documents

Patent Document 1: Japanese Patent Application Laid-Open (JP-A) No. 313995/98

DISCLOSURE OF THE INVENTION

Problem that the Invention is to Solve

The present invention has been created in view of the problems in the prior art as mentioned above and its object is to provide padding which is suitable as bedding and clothing items having both exothermic property upon moisture absorption and bulkiness in high levels and being able to give comfortable environment to human body.

Means for Solving the Problem

In order to achieve the above objects, the present inventors have eagerly conducted investigations for a cross-linked polyacrylate fiber exhibiting excellent exothermic property upon moisture absorption and, as a result, they have found that a fiber in a type of salt of magnesium or calcium which is a divalent metal has not only the exothermic property upon moisture absorption but also high bulkiness and that, as a result thereof, it can achieve both exothermic property upon moisture absorption and bulkiness in high levels when said fiber is used together with polyester fiber whereupon they have achieved the present invention.

Thus, the present invention has the constituent features of the following (1) to (7):

(1) A padding containing 25 to 85% by weight of polyester fiber, characterized in that the padding contains 15 to 75% by weight of a cross-linked polyacrylate fiber of a magnesium salt type and/or a calcium salt type.

(2) The padding according to (1), wherein single fiber elastic modulus of the polyester fiber is 30 cN/dtex or more.

(3) The padding according to (1) or (2), wherein single fiber elastic modulus of the cross-linked polyacrylate fiber of a magnesium salt type and/or a calcium salt type is 20 cN/dtex or more.

(4) The padding according to any of (1) to (3), wherein weight-average single fiber elastic modulus of the fibers used in the padding is 25 cN/dtex or more.

(5) The padding according to any of (1) to (4), wherein specific volume thereof is 50 to 100 $cm^3/g$.

(6) The padding according to any of (1) to (5), wherein coefficient of moisture absorption thereof is 6.0 to 40%.

(7) The padding according to any of (1) to (6), wherein in-bed temperature and in-bed humidity measured after 30 minutes from the start of perspiration after 10 minutes under the condition of 15° C. and 50% RH are 32° C. or higher and 70% or lower, respectively.

Advantages of the Invention

The padding of the present invention has such an advantage that both exothermic property upon moisture absorption and bulkiness can be achieved in high levels, which advantage has never been attained in the conventional padding using a multipurpose fiber such as polyester or using a cross-linked polyacrylate fiber of a sodium salt type, etc. The advantage as such is resulted not only by high bulkiness of polyester fiber but also by high single fiber elastic modulus and exothermic property upon moisture absorption of the polyacrylate fiber of a magnesium salt type or a calcium salt type. Due to its bulkiness, the padding of the present invention can incorporate large amount of air therein. Then, due to exothermic property upon moisture absorption, it can convert the incorporated air into warm air with low humidity. Therefore, it can be advantageously used as a padding for bedding and for outdoor clothing in autumn and winter.

BEST MODE FOR CARRYING OUT THE INVENTION

Figure 1:
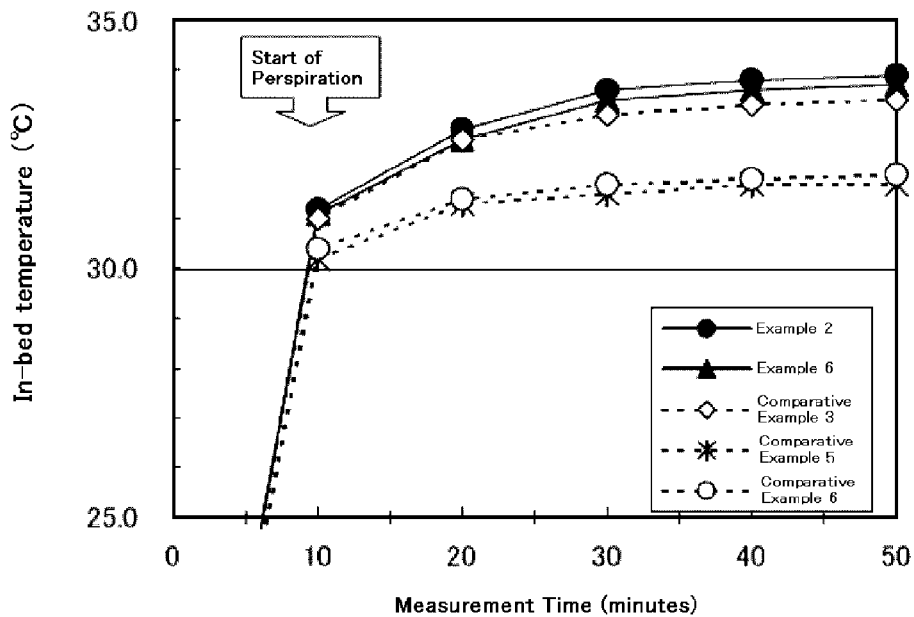
FIG. 1 is a graph which shows changes in the in-bed temperature with elapse of time for Examples 2 and 6 and Comparative Examples 3, 5 and 6.

The padding of the present invention will now be illustrated in detail as follows.

The padding of the present invention is characterized in that, as a result of containing not only a polyester fiber but also a cross-linked polyacrylate fiber of a magnesium type and/or a calcium type in a predetermined amount or more, there are achieved both of the exothermic property upon moisture absorption resulting in warm air with low humidity and the bulkiness resulting in a sustaining warmth-keeping property in high levels.

As to a polyester fiber to be used in the present invention, although there may be used a polymer of a polyester type which has been commonly used for padding, it is preferred to use a polyethylene terephthalate fiber. Examples of its form include a regular product without particular processing, a conjugated product, a hollow product and a conjugated hollow product. For achieving a high bulkiness as a padding containing a cross-linked polyacrylate fiber having moisture-absorption property, a regular product without particular processing is preferred.

In order to achieve high bulkiness of the padding, single fiber fineness of the polyester fiber is preferred to be 5 to 18 dtex and more preferred to be 5 to 14 dtex. Fiber length thereof is preferred to be 40 to 100 mm and more preferred to be 50 to 80 mm. Single fiber elastic modulus of the polyester fiber is preferred to be 28 cN/dtex or more and it is more preferred to be 30 cN/dtex or more for achieving high bulkiness of the padding. Although the upper limit of the single fiber elastic modulus of the polyester fiber is not limited, it is practically about 100 N/dtex. The polyester fiber having high single fiber elastic modulus can be produced by using, for example, polyethylene terephthalate or polyethylene naphthalate.

Content of the polyester fiber in the padding of the present invention is 25 to 85% by weight, preferably 35 to 80% by weight, and more preferably 40 to 75% by weight. When the polyester fiber is less than the above range, high bulkiness is hardly achieved and the padding cannot contain much air therein whereby there is a risk that high warmth-keeping property cannot be maintained. When the polyester fiber is more than the above range, content of the cross-linked polyacrylate fiber lowers whereby the effect of exothermic property upon moisture absorption of the cross-linked polyacrylate fiber cannot be well enjoyed and there is a risk that warmth-keeping property cannot be maintained at low humidity. In the padding of the present invention, although a multipurpose fiber (fiber such as acrylic fiber or cotton) other than the polyester fiber may be used, it is preferred to choose such a one having single fiber elastic modulus of 10 cN/dtex or more. When the fiber having low single fiber elastic modulus is abundantly used, high bulkiness of the padding as a whole becomes insufficient and there is a risk that the warmth-keeping property becomes low.

It is necessary that the cross-linked polyacrylate fiber used in the present invention is a type of salt of magnesium or calcium which is a divalent metal. A univalent metal salt type such as a sodium salt type is not preferred since its bulkiness is not sufficient and warmth-keeping property is not long-lasting. Other divalent metal salt type such as a zinc salt type is not preferred as well since its exothermic property upon moisture absorption is inferior and comfortable environment cannot be achieved thereby. Since the magnesium salt type or the calcium salt type has an appropriately high bulkiness in spite of its high exothermic property upon moisture absorption, the advantage of high bulkiness of the polyester fiber can be well enjoyed. The reason why the magnesium salt type or the calcium salt type is excellent in its bulkiness is presumed to be the fact that, in the case of the two divalent metals, ionic cross-linked structure with carboxyl group is formed among the polymers whereby the elastic modulus is enhanced. The cross-linked polyacrylate fiber of the present invention is obtained by making an acrylic fiber ultrahighly hydrophilic and cross-linked by means of modification, and it has a carboxylic group of a magnesium type or a calcium type as a hydrophilic group. The cross-linked polyacrylate fiber of a magnesium salt type or a calcium salt type is the already-known fiber. The magnesium type one and the calcium type one can be easily produced by referring, for example, to Japanese Patent No. 4,529,145 and Japanese Patent Application Laid-Open (JP-A) No. 59872/97, respectively.

The content of the cross-linked polyacrylate fiber of a magnesium salt type or a calcium salt type in the padding of the present invention is 15 to 75% by weight, preferably 20 to 65% by weight, and more preferably 25 to 60% by weight. When the content is less than the above range, exothermic property upon moisture absorption cannot be fully achieved whereby the wet air incorporated thereinto cannot be fully converted to warm air with low humidity. When the content exceeds the above range, no improvement in the effect is achieved while being economically disadvantage. The single fiber elastic modulus of the cross-linked polyacrylate fiber of a magnesium salt type or a calcium salt type is considerably high as compared with that of a sodium salt type (about 5 cN/dtex) and is usually from 20 to 35 cN/dtex. Therefore, the cross-linked polyacrylate fiber of a magnesium salt type or a calcium salt type can be said to have very high bulkiness as compared with the conventionally used sodium salt type. In order to maintain the bulkiness highly in the padding of the present invention, the weight-average single fiber elastic modulus of the whole fibers used is preferably 25 cN/dtex or more, and more preferably from 30 to 100 cN/dtex.

Since the padding of the present invention contains a predetermined amount or more of the cross-linked polyacrylate fiber of a magnesium salt type and/or a calcium salt type in addition to the polyester fiber as mentioned above, it is possible to achieve the moisture-absorption coefficient of within a range of 6.0 to 40% at 20° C. and 65% RH. When the moisture-absorption coefficient is within such a range, human skin can feel a lowly humid warmness of the material upon touching thereto.

Moreover, since the padding of the present invention contains a predetermined amount or more of the cross-linked polyacrylate fiber of a magnesium salt type and/or a calcium salt type in addition to the polyester fiber as mentioned above, it is possible to achieve the specific volume of within a range of from 50 to 100 cm$^3$/g. Such a high bulkiness can be resulted by the high single fiber elastic modulus of the cross-linked polyacrylate fiber of a magnesium salt type or a calcium salt type and the polyester fiber. When the specific volume is less than 50 cm$^3$/g, no sufficient air can be incorporated into the padding whereby there is a risk that the warmth-keeping property becomes insufficient. When the specific volume is more than 100 cm$^3$/g or more, a loss of shape is apt to easily happen by means of application of only a little force whereby there is a risk that the shape-keeping property becomes insufficient.

Further, since the padding of the present invention contains a predetermined amount or more of the cross-linked polyacrylate fiber of a magnesium salt type and/or a calcium salt type in addition to the polyester fiber as mentioned above, the in-bed temperature and the in-bed humidity measured after 30 minutes from the start of perspiration after 10 minutes under the condition of 15° C. and 50% RH according to the measuring method of Examples are now able to be made 32° C. or higher (although there is no limitation for the upper limit, it is actually 36° C. or lower) and 70% or lower (although there is no limitation for the lower limit, it is actually 20% or higher), respectively. Those properties are resulted by high moisture-absorption property and high bulkiness of the cross-linked polyacrylate fiber of a magnesium salt type or a calcium salt type and also by high bulkiness of the polyester fiber. When the in-bed temperature and humidity are within those ranges, human skin can feel a lowly humid comfortable warmness of the material upon touching thereto.

There is no particular limitation for the method of manufacturing the padding of the present invention but the conventionally known common method for the manufacture of padding may be applied. For example, it is possible to apply a method where the material padding is previously opened and mixed using an opening machine and then processed into a web shape using a curding machine. It is also possible for a purpose of imparting the shape stability to add a step of entangling the fibers by means of needle punching or water punching and a step of inter-fiber adhesion by means of thermally adhesive resin.

Since the padding of the present invention illustrated hereinabove has both moisture-absorption property and bulkiness in high levels, it exhibits the comfortableness of warmness with low humidity which has not been achieved up to now. Therefore, the bedding items (such as upper bedclothes, lower bedclothes and pillow) or outer clothing for autumn and winter using the padding of the present invention can generate heat upon adsorption of the moisture discharged from human body whereby they become warm by suppressing the humidity and the resulting warmness can be continuously felt by the warmth-keeping property due to high bulkiness.

EXAMPLES

The present invention will now be more specifically illustrated by way of the following Examples although the present invention is not limited by them. The ratios in the Examples are those by weight unless otherwise mentioned. The methods for evaluating the characteristics in the Examples are as follows.

(1) Coefficient of Moisture Absorption.

A sample (about 2.5 g) is dried at 105° C. for 16 hours and its weight is measured (W1 [g]). Then the sample is placed for 24 hours in a container of constant temperature and humidity being adjusted to 20° C. and 65% RH, respectively. Weight of the sample moistened as such is measured (W2 [g]). From those measured results, coefficient of moisture absorption is calculated according to the following formula:

Coefficient of moisture absorption [%]=[(W2−W1)/W1]×100

(2) Specific Volume

A sample (50 g) was opened lightly and then opened using a curding machine followed by laminating. Six test pieces each being in a size of 10 cm×10 cm were cut out therefrom, placed in a vat and allowed to stand in a container of constant temperature and humidity for not shorter than 24 hours. They were then taken out from the container of constant temperature and humidity and layered so as to make the mass 10 g to 10.5 g and the layered one was precisely weighed. An acrylic board of 10 cm×10 cm was placed thereon, a weight (500 g) was then placed thereon for 30 seconds, the weight was removed and the board was allowed to stand for 30 seconds. Such an operation was repeated for three times and, after being allowed to stand for 30 seconds since the removal of a weight of 500 g, heights of four corners are measured, mean value thereof is determined and specific volume is calculated by the following formula:

Specific volume (cm³/g)=10×10×(mean value (mm) of heights of four corners of the sample)/10/(mass (g) of the test piece)

(3) in-Bed Temperature and in-Bed Humidity

Perspiration is started after 10 minutes from the start of a test using a perspiration simulation measuring apparatus under the condition where water supplying amount (perspired amount) is 100 g/m²·h, hot plate temperature is 37° C., distance between the sample and the hot plate is 0.5 cm and environmental temperature/humidity is 15° C./50% RH whereupon the changes in the temperature and the humidity of a space between the hot plat and the sample are measured.

Incidentally, the perspiration simulation apparatus is constituted from a heat-generating mechanism comprising a substrate having perspiration pores and a heat generator, a water delivering mechanism for supplying water to the perspiration pores, a heat generation controlling mechanism for controlling the temperature of the heat generator and a sensor for temperature/humidity. The substrate is made of brass, has an area of 120 cm², is equipped with six perspiration pores and is controlled to a predetermined temperature by a heat generator comprising a plane heater. The water delivering mechanism uses a tube pump and delivers a predetermined amount of water into the perspiration pores of the substrate. On the surface of the substrate, artificial skin comprising a polyester multifilament textile of 0.1 mm thickness is adhered and water coming out from the perspiration pores is spread onto the substrate surface to result in a perspiration state. An outer frame of 0.5 cm height is formed around the substrate whereby the sample can be set at the position being 0.5 cm apart from the substrate. The temperature/humidity sensor is located at the space between the substrate and the sample (padded bedclothes) and measures the temperature and the humidity of "the space surrounded by the substrate, the sample, and the outer frame" when the substrate is in a perspiration state. The padded bedclothes has been prepared by using a textile comprising 100% of polyester as lateral cloth and by applying a quilting thereto.

Example 1

Cross-linked polyacrylate fiber of a magnesium salt type (single fiber fineness: 5.0 dtex; fiber length: 48 mm; single fiber elastic modulus: 26 cN/dtex) and polyester fiber (polyethylene terephthalate fiber; single fiber fineness: 7.8 dtex; fiber length: 64 mm; single fiber elastic modulus: 32 cN/dtex; product number by Toray: 201-7.8Tx54) were opened and mixed using a preliminary opening machine so that their ratio by weight was made 20/80 and then made into a padding using a curding machine. Constitution and evaluated result of this padding are shown in Table 1.

Example 2

Figure 2:
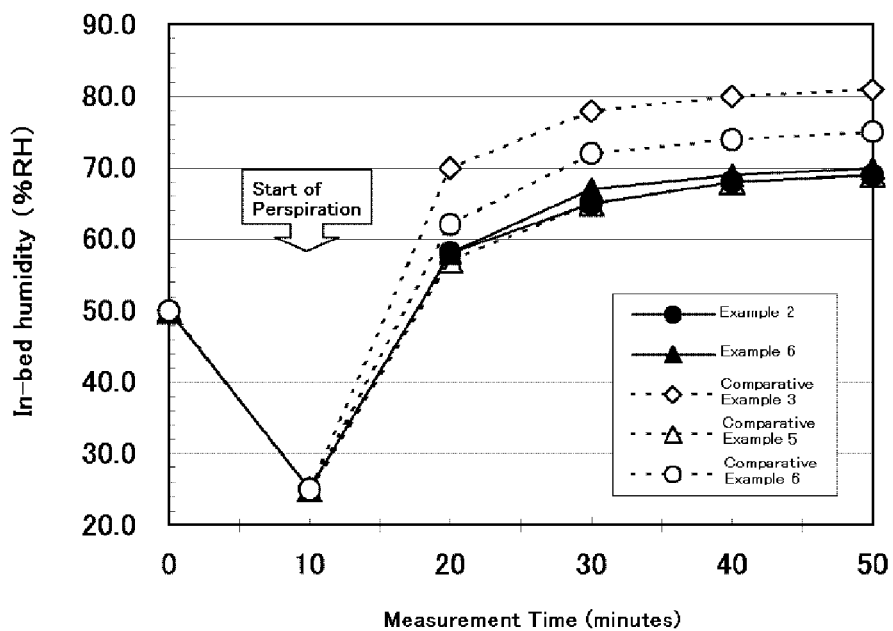
FIG. 2 is a graph which shows changes in the in-bed humidity with elapse of time for Examples 2 and 6 and Comparative Examples 3, 5 and 6.

Padding was prepared by the same manner as in Example 1 except that the ratio by weight of the cross-linked polyacrylate fiber of a magnesium salt type to the polyester fiber was changed to 30/70. Constitution and evaluated result of this padding are shown in Table 1. Further, changes in the in-bed temperature and the in-bed humidity of this padding with elapse of time are shown in FIGS. 1 and 2, respectively.

Example 3

Padding was prepared by the same manner as in Example 1 except that the ratio by weight of the cross-linked polyacrylate fiber of a magnesium salt type to the polyester fiber was changed to 50/50. Constitution and evaluated result of this padding are shown in Table 1.

Example 4

Padding was prepared by the same manner as in Example 1 except that the ratio by weight of the cross-linked polyacrylate fiber of a magnesium salt type to the polyester fiber was changed to 70/30. Constitution and evaluated result of this padding are shown in Table 1.

Example 5

Padding was prepared by the same manner as in Example 1 except that a cross-linked polyacrylate fiber of a calcium salt type (single fiber fineness: 5.0 dtex; fiber length: 48 mm; single fiber elastic modulus: 29 cN/dtex) was used instead of the cross-linked polyacrylate fiber of a magnesium salt type. Constitution and evaluated result of this padding are shown in Table 1.

Example 6

Padding was prepared by the same manner as in Example 2 except that a cross-linked polyacrylate fiber of a calcium salt type (single fiber fineness: 5.0 dtex; fiber length: 48 mm; single fiber elastic modulus: 29 cN/dtex) was used instead of the cross-linked polyacrylate fiber of a magnesium salt type. Constitution and evaluated result of this padding are shown in Table 1. Further, changes in the in-bed temperature and the in-bed humidity of this padding with elapse of time are shown in FIGS. 1 and 2, respectively.

Example 7

Padding was prepared by the same manner as in Example 3 except that a cross-linked polyacrylate fiber of a calcium salt type (single fiber fineness: 5.0 dtex; fiber length: 48 mm; single fiber elastic modulus: 29 cN/dtex) was used instead of the cross-linked polyacrylate fiber of a magnesium salt type. Constitution and evaluated result of this padding are shown in Table 1.

Example 8

Padding was prepared by the same manner as in Example 4 except that a cross-linked polyacrylate fiber of a calcium salt type (single fiber fineness: 5.0 dtex; fiber length: 48 mm; single fiber elastic modulus: 29 cN/dtex) was used instead of the cross-linked polyacrylate fiber of a magnesium salt type. Constitution and evaluated result of this padding are shown in Table 1.

Example 9

Padding was prepared by the same manner as in Example 1 except that the same cross-linked polyacrylate fiber of a magnesium salt type as that in Example 1 and the same polyester fiber as that in Example 1 and acrylic fiber (single fiber fineness: 4.8 dtex; fiber length: 50 mm; single fiber elastic modulus: 10 cN/dtex) were used in a ratio by weight of 30/60/10 instead of using the cross-linked polyacrylate fiber of a magnesium salt type and the polyester fiber in a ratio by weight of 20/80. Constitution and evaluated result of this padding are shown in Table 1.

Example 10

Padding was prepared by the same manner as in Example 1 except that the same cross-linked polyacrylate fiber of a magnesium salt type as that in Example 1, the same cross-linked polyacrylate fiber of a calcium salt type as that in Example 5, and the same polyester fiber as that in Example 1 were used in a ratio by weight of 15/15/70 instead of using the cross-linked polyacrylate fiber of a magnesium salt type and the polyester fiber in a ratio by weight of 20/80. Constitution and evaluated result of this padding are shown in Table 1.

Comparative Example 1

Padding was prepared by the same manner as in Example 1 except that the ratio by weight of the cross-linked polyacrylate fiber of a magnesium salt type to the polyester fiber was changed to 10/90. Constitution and evaluated result of this padding are shown in Table 1.

Comparative Example 2

Padding was prepared by the same manner as in Comparative Example 1 except that the same cross-linked polyacrylate fiber of a calcium salt type as that in Example 5 was used instead of the cross-linked polyacrylate fiber of a magnesium salt type. Constitution and evaluated result of this padding are shown in Table 1.

Comparative Example 3

Padding was prepared by the same manner as in Example 1 except that 100% by weight of the same polyester fiber as that in Example 1 was used. Constitution and evaluated result of this padding are shown in Table 1. Further, changes in the in-bed temperature and the in-bed humidity of this padding with elapse of time are shown in FIGS. 1 and 2, respectively.

Comparative Example 4

Padding was prepared by the same manner as in Example 1 except that 100% by weight of the same acrylic fiber as that in Example 9 was used. Constitution and evaluated result of this padding are shown in Table 1. Further, changes in the in-bed temperature and the in-bed humidity of this padding with elapse of time are shown in FIGS. 1 and 2, respectively.

Comparative Example 5

Padding was prepared by the same manner as in Example 2 except that a cross-linked polyacrylate fiber of a sodium type (single fiber fineness: 5.0 dtex; fiber length: 48 mm; single fiber elastic modulus: 5 cN/dtex) was used instead of the cross-linked polyacrylate fiber of a magnesium salt type. Constitution and evaluated result of this padding are shown in Table 1.

Comparative Example 6

Padding was prepared by the same manner as in Example 2 except that a cross-linked polyacrylate fiber of a zinc salt type (single fiber fineness: 5.0 dtex; fiber length: 48 mm; single fiber elastic modulus: 26 cN/dtex) was used instead of the cross-linked polyacrylate fiber of a magnesium salt type. Constitution and evaluated result of this padding are shown in Table 1.

TABLE 1

|  | Fiber constitution and content ratio by weight (%) | Coefficient of moisture absorption (%) | Specific volume (cm³/g) | In-bed temperature (°C.) | In-bed humidity (%) |
| --- | --- | --- | --- | --- | --- |
| Example 1 | Cross-linked polyacrylate fiber of a magnesium salt type/Polyester = 20/80 | 8.1 | 64.2 | 33.4 | 68 |
| Example 2 | Cross-linked polyacrylate fiber of a magnesium salt type/Polyester = 30/70 | 12.2 | 61.3 | 33.6 | 65 |
| Example 3 | Cross-linked polyacrylate fiber of a magnesium salt type/Polyester = 50/50 | 20.3 | 55.5 | 34.1 | 63 |
| Example 4 | Cross-linked polyacrylate fiber of a magnesium salt type/Polyester = 70/30 | 28.4 | 51.1 | 34.7 | 62 |

TABLE 1-continued

| | Fiber constitution and content ratio by weight (%) | Coefficient of moisture absorption (%) | Specific volume (cm³/g) | In-bed temperature (°C.) | In-bed humidity (%) |
|---|---|---|---|---|---|
| Example 5 | Cross-linked polyacrylate fiber of a calcium salt type/Polyester = 20/80 | 6.1 | 68.3 | 33.2 | 69 |
| Example 6 | Cross-linked polyacrylate fiber of a calcium salt type/Polyester = 30/70 | 9.2 | 66.0 | 33.4 | 67 |
| Example 7 | Cross-linked polyacrylate fiber of a calcium salt type/Polyester = 50/50 | 15.3 | 61.3 | 33.7 | 65 |
| Example 8 | Cross-linked polyacrylate fiber of a calcium salt type/Polyester = 70/30 | 21.4 | 56.6 | 34.3 | 64 |
| Example 9 | Cross-linked polyacrylate fiber of a magnesium salt type/Polyester/Acrylic fiber = 30/60/10 | 12.3 | 58.4 | 33.8 | 66 |
| Example 10 | Cross-linked polyacrylate fiber of a magnesium salt type/Cross-linked polyacrylate fiber of a calcium salt type/polyester = 15/15/70 | 10.7 | 63.7 | 33.6 | 67 |
| Comparative Example 1 | Cross-linked polyacrylate fiber of a magnesium salt type/Polyester = 10/90 | 4.1 | 67.1 | 33.2 | 74 |
| Comparative Example 2 | Cross-linked polyacrylate fiber of a calcium salt type/Polyester = 10/90 | 2.7 | 70.7 | 33.1 | 75 |
| Comparative Example 3 | Polyester = 100 | 0 | 73.6 | 33.1 | 81 |
| Comparative Example 4 | Acrylic fiber = 100 | 1.0 | 31.7 | 33.3 | 80 |
| Comparative Example 5 | Cross-linked polyacrylate fiber of a sodium type/Polyester = 30/70 | 12.3 | 45.9 | 31.5 | 65 |
| Comparative Example 6 | Cross-linked polyacrylate fiber of a zinc salt type/Polyester = 30/70 | 5.1 | 61.0 | 31.7 | 72 |

As will be noted from Table 1, since the paddings of Examples 1 to 10 exhibit both moisture-absorption property and bulkiness (specific volume) in high levels, the in-bed humidity can be made low while the high in-bed temperature is still maintained whereby these paddings can be used very comfortably. On the contrary, the paddings of Comparative Example 1 having small amount of the cross-linked polyacrylate fiber of a magnesium salt type, Comparative Example 2 having small amount of the cross-linked polyacrylate fiber of a calcium salt type and Comparative Example 6 using a cross-linked polyacrylate fiber of a zinc salt type are inferior in moisture-absorption property whereby their in-bed humidity is high and they are inferior in their comfortableness. The padding of Comparative Example 3 comprising polyester fiber only is inferior in its moisture-absorption property whereby it is inferior in its comfortableness. The padding of Comparative Example 4 comprising acrylic fiber only is inferior in both moisture-absorption property and bulkiness whereby it is much inferior in comfortableness. The padding of Comparative Example 5 using a cross-linked polyacrylate fiber of a sodium type is inferior in its bulkiness whereby it is inferior in its comfortableness. It is also noted from FIGS. 1 and 2 that the bedclothes prepared by the paddings of Examples 2 and 6 being within a scope of the present invention can maintain their high warmth-keeping property at low humidity even with elapse of time while the bedclothes prepared by the paddings of Comparative Examples 3, 5 and 6 being out of scope of the present invention cannot attain both low humidity and high warmth-keeping property whereby they are not comfortable to humans.

INDUSTRIAL APPLICABILITY

Since the padding of the present invention exhibits both exothermic property upon moisture absorption and bulkiness in high levels, it can be comfortably used as bedding, clothing, etc. directly touching a human skin.

The invention claimed is:

1. A padding containing 25 to 85% by weight of polyester fiber, characterized in that the padding contains 15 to 75% by weight of a cross-linked polyacrylate fiber of a magnesium salt type and/or a calcium salt type and that weight-average single fiber elastic modulus of the fibers used in the padding is 25 cN/dtex or more.

2. The padding according to claim 1, wherein single fiber elastic modulus of the polyester fiber is 28 cN/dtex or more.

3. The padding according to claim 1, wherein single fiber elastic modulus of the cross-linked polyacrylate fiber of a magnesium salt type and/or a calcium salt type is 20 cN/dtex or more.

4. The padding according to claim 1, wherein specific volume thereof is 50 to 100 cm³/g.

5. The padding according to claim 1, wherein coefficient of moisture absorption thereof is 6.0 to 40%.

6. The padding according to claim 1, wherein in-bed temperature and in-bed humidity measured after 30 minutes from the start of perspiration after 10 minutes under the condition of 15° C. and 50% RH are 32° C. or higher and 70% or lower, respectively.

* * * * *